(12) United States Patent
Lee et al.

(10) Patent No.: US 8,638,409 B2
(45) Date of Patent: Jan. 28, 2014

(54) DUAL LIQUID CRYSTAL DISPLAY

(75) Inventors: Doo-Won Lee, Seoul (KR); Sang-Wook Lee, Seoul (KR); Sung-Jun Kim, Seoul (KR)

(73) Assignee: Samsung Display Co., Ltd., Yongin, Gyeonggi-Do (KR)

( * ) Notice: Subject to any disclaimer, the term of this patent is extended or adjusted under 35 U.S.C. 154(b) by 196 days.

(21) Appl. No.: 13/044,058

(22) Filed: Mar. 9, 2011

(65) Prior Publication Data

US 2011/0234943 A1  Sep. 29, 2011

(30) Foreign Application Priority Data

Mar. 23, 2010 (KR) .................. 10-2010-0025764

(51) Int. Cl.
*G02F 1/1335* (2006.01)

(52) U.S. Cl.
USPC .................. 349/67; 349/61; 349/62

(58) Field of Classification Search
USPC ...................... 349/63, 67
See application file for complete search history.

(56) References Cited

U.S. PATENT DOCUMENTS

| | | | |
|---|---|---|---|
| 6,352,350 B1 * | 3/2002 | Ma ................... | 362/19 |
| 6,768,529 B2 * | 7/2004 | Umemoto et al. ........... | 349/114 |
| 6,802,619 B2 * | 10/2004 | Ohizumi et al. .............. | 362/603 |
| 6,954,237 B2 * | 10/2005 | Ohizumi et al. ................ | 349/63 |
| 7,015,989 B2 * | 3/2006 | Kim et al. ...................... | 349/63 |
| 7,027,113 B2 * | 4/2006 | Kim et al. ...................... | 349/63 |
| 7,030,945 B2 * | 4/2006 | Umemoto et al. .............. | 349/65 |
| 7,190,425 B2 * | 3/2007 | Hong .............................. | 349/63 |
| 7,391,485 B2 * | 6/2008 | Kim et al. ...................... | 349/61 |
| 7,768,605 B2 * | 8/2010 | Polak ........................... | 349/114 |
| 8,188,954 B2 * | 5/2012 | Hwang et al. .................. | 345/87 |
| 2002/0057561 A1 * | 5/2002 | Niida et al. .................... | 362/26 |
| 2002/0064037 A1 * | 5/2002 | Lee ................................. | 362/31 |
| 2003/0063235 A1 * | 4/2003 | Nakaoka et al. ............... | 349/65 |
| 2003/0165054 A1 * | 9/2003 | Ohizumi et al. ............... | 362/31 |
| 2004/0183960 A1 * | 9/2004 | Kim et al. ...................... | 349/61 |
| 2005/0001796 A1 * | 1/2005 | Liu ................................. | 345/87 |
| 2005/0046765 A1 * | 3/2005 | Liu ................................. | 349/61 |
| 2005/0046768 A1 * | 3/2005 | Wu ................................ | 349/65 |
| 2008/0129926 A1 * | 6/2008 | Seo et al. ....................... | 349/65 |
| 2008/0259238 A1 * | 10/2008 | Kim .............................. | 349/48 |
| 2009/0015751 A1 * | 1/2009 | Kim et al. ...................... | 349/63 |
| 2011/0234943 A1 * | 9/2011 | Lee et al. ....................... | 349/65 |

FOREIGN PATENT DOCUMENTS

| | | |
|---|---|---|
| JP | 2007-065695 | 3/2007 |
| KR | 1020060116879 | 11/2006 |
| KR | 1020080001520 | 1/2008 |

* cited by examiner

*Primary Examiner* — Rhonda Peace
(74) *Attorney, Agent, or Firm* — F. Chau & Associates, LLC

(57) ABSTRACT

A liquid crystal display (LCD) is provided. The LCD includes at least one light source which provides light, a display panel which includes pixels reflecting the light from the light source, and at least one light guide plate (LGP) which is formed substantially parallel to a surface of the display panel and is separated from the display panel, wherein a predetermined space is defined between the LGP and the display panel, and the LGP guides the light emitted from the light source to the pixels and allows the light reflected by the pixels to pass through the LGP.

18 Claims, 14 Drawing Sheets

DUAL LIQUID CRYSTAL DISPLAY

This application claims priority to Korean Patent Application No. 10-2010-0025764 filed on Mar. 23, 2010, the contents of which are incorporated herein by reference in their entirety.

BACKGROUND

1. Technical Field

The present invention relates to a liquid crystal display (LCD), and more particularly, to a dual LCD which displays images on both surfaces thereof.

2. Discussion of the Related Art

Being slim, lightweight, and low in power consumption, liquid crystal displays (LCDs) are extensively used in the industries of monitors, notebooks, mobile phones, and the like. LCDs have also been used as digital information displays (DIDs). DIDs are devices that display advertisements and information in public places, such as airports, subway stations, large shopping malls, and movie theaters. Unlike conventional electronic display boards and billboards with limited resolution and color representation, DIDs can display various types of information including digital moving images.

Dual LCDs that may display the same image or different images on both surfaces thereof, for example, front and back surfaces, may be used for DIDs.

For a DID to achieve its intended effects, it is important to uniformly deliver light to the entire surface of an LCD panel included in the DID.

Accordingly, there is a need for a dual LCD for DIDs that may uniformly deliver light to the entire surface of an LCD panel and thus eliminate the luminance imbalance between regions of the dual LCD.

SUMMARY OF THE INVENTION

Embodiments of the present invention provide a liquid crystal display (LCD) which can be operated with low power consumption and exhibits increased luminance uniformity.

According to an embodiment of the present invention, there is provided an LCD including at least one light source which provides light, a display panel which includes pixels reflecting the light from the light source, and at least one light guide plate (LGP) which is formed substantially parallel to a surface of the display panel and is separated from the display panel, wherein a predetermined space is defined between the LGP and the display panel, and the LGP guides the light emitted from the light source to the pixels and allows the light reflected by the pixels to pass through the LGP.

According to an embodiment of the present invention, there is provided an LCD including at least one light source which provides light, a display panel which includes pixels reflecting the light from the light source, and at least one optical path controller which is disposed in an optical path between the light source and the pixels of the display panel and controls a path of the light emitted from the light source to proceed to the pixels of the display panel.

BRIEF DESCRIPTION OF THE DRAWINGS

The embodiments of the present invention will become more apparent by describing in detail exemplary embodiments thereof with reference to the attached drawings, in which.

DETAILED DESCRIPTION OF THE INVENTION

Figure 1A:
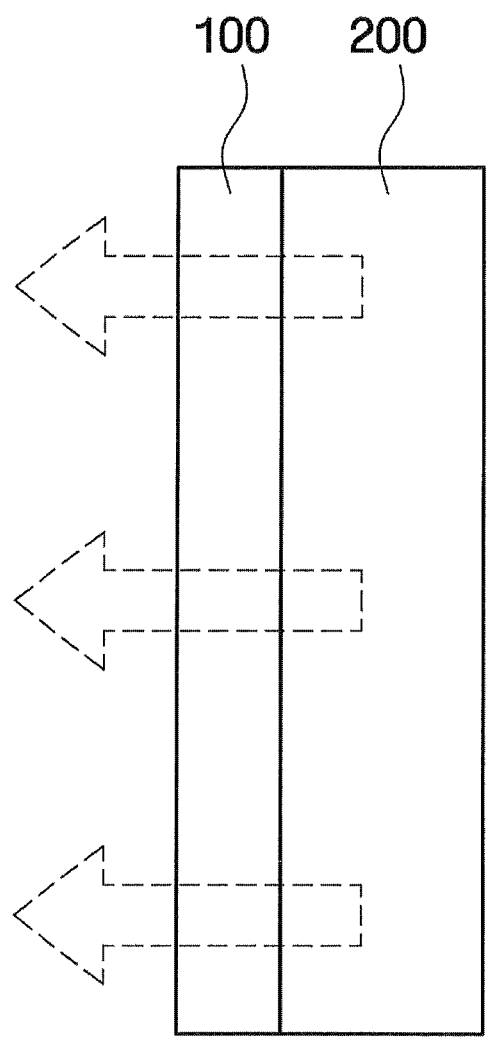
FIG. 1A is a side view of a transmissive liquid crystal display (LCD)

Exemplary embodiments of the present invention will now be described more fully with reference to the accompanying drawings. The invention may, however, be embodied in many different forms and should not be construed as being limited to the embodiments set forth herein. In the drawings, the thicknesses of layers and regions may be exaggerated for clarity. Like reference numerals in the drawings may denote like elements. It will be understood that when a layer, film, region or plate is referred to as being "on" or "over" another element or layer, it can be directly on another element or layer or intervening elements or layers may also be present.

FIG. 1A is a side view of a transmissive liquid crystal display (LCD). Referring to FIG. 1A, the transmissive LCD includes a display panel 100 which includes one or more pixels and a light unit 200 which is parallel to a surface of the display panel 100. In the transmissive LCD, light emitted from the light unit 200 passes through the display panel 100 to be seen from a viewer's side. The pixels of the display panel 200 allow light emitted from the light unit 200 to pass therethrough in equal or different amounts, with the transmittance of each pixel controlled, so that the combination of the pixels displays an image. In transmissive LCDs, a light unit may be located behind an LCD panel as seen from the position of a viewer. The light unit is also referred to as a backlight unit.

Figure 1B:
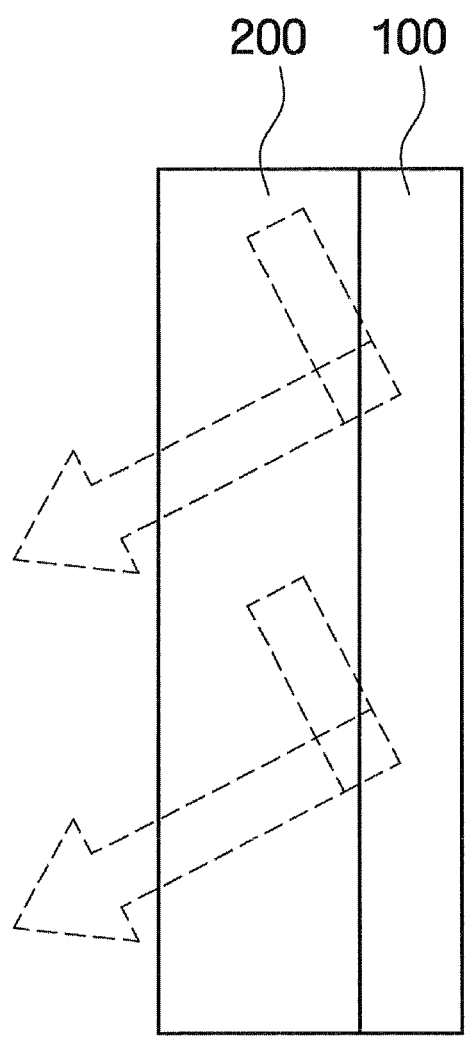
FIG. 1B is a side view of a reflective LCD.

FIG. 1B is a side view of a reflective LCD. Referring to FIG. 1B, a light unit 200 is located between a viewer (not shown) and a display panel 100. Light emitted from the light unit 200 is incident upon the display panel 100 and is reflected by each pixel of the display panel 100. Then, the reflected light passes through the light unit 200 toward the viewer's side. The pixels of the display panel 200 reflect light from the light unit 200 in equal or different amounts, with the reflectivity of each pixel controlled, so that the combination of the pixels displays an image. In reflective LCDs, a light unit may be located in front of an LCD panel as viewed from the position of a viewer. The light unit is also referred to as a front light unit.

Figure 2:
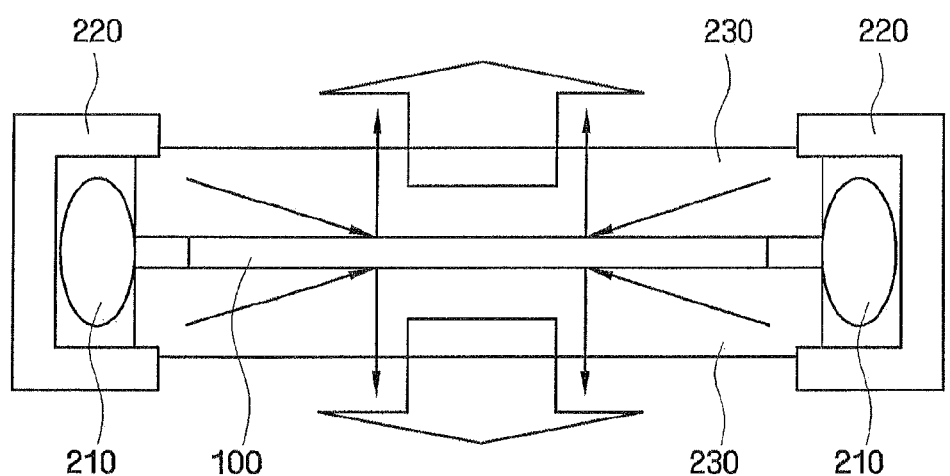
FIG. 2 is a side view of a dual reflective LCD according to an exemplary embodiment of the present invention.

FIG. 2 is a side view of a dual reflective LCD according to an exemplary embodiment of the present invention. Referring to FIG. 2, light emitted from light sources 210 may pass through light guide plates (LGPs) 230 to a display panel 100.

The LGPs 230 may contact the display panel 100. The light sources 210 may be located on sides of the display panel 100 as shown in FIG. 2, and light emitted from the light sources 210 can be uniformly delivered to all regions of the display panel 100 by the LGPs 230.

Light emitted from the light sources 210 arrives at each pixel of the display panel 100 via the LGPs 230. Then, the pixels of the display panel 100 reflect the light in equal or different amounts, thereby forming an image. One LGP 230 may be installed either in front of or behind the display panel 100. Alternatively, two LGPs 230 may respectively be installed both in front of and behind the display panel 100. When the LGPs 230 are respectively installed both in front of and behind the display panel 100, light can be uniformly input to the display panel 100 from the front and rear sides of the display panel 100. Accordingly, the image quality can be improved on both front and rear sides of the display panel 100.

As described above, the light sources 210 may be located on sides of the display panel 100. The light sources 210 may be located within a structure formed in a region around the display panel 100, for example, within a chassis 220.

Figure 3A:
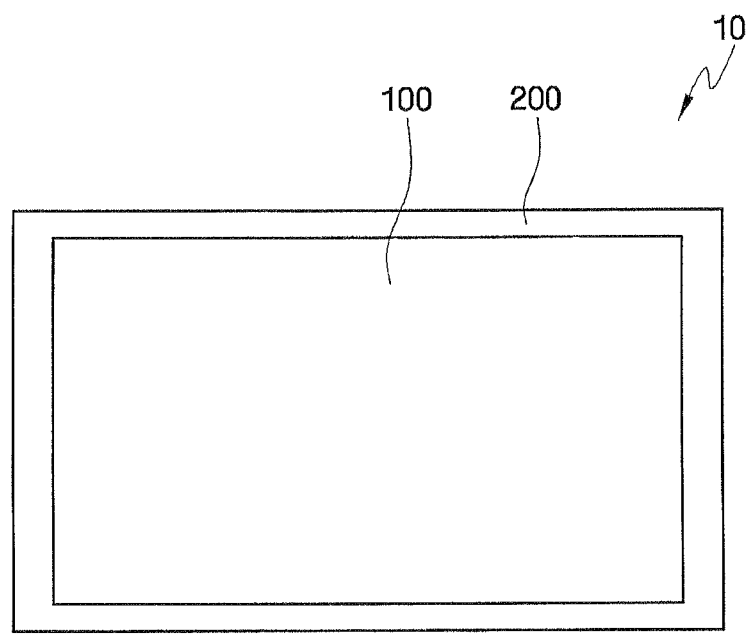
FIG. 3A is a front view of an LCD according to an exemplary embodiment of the present invention.
Figure 3B:
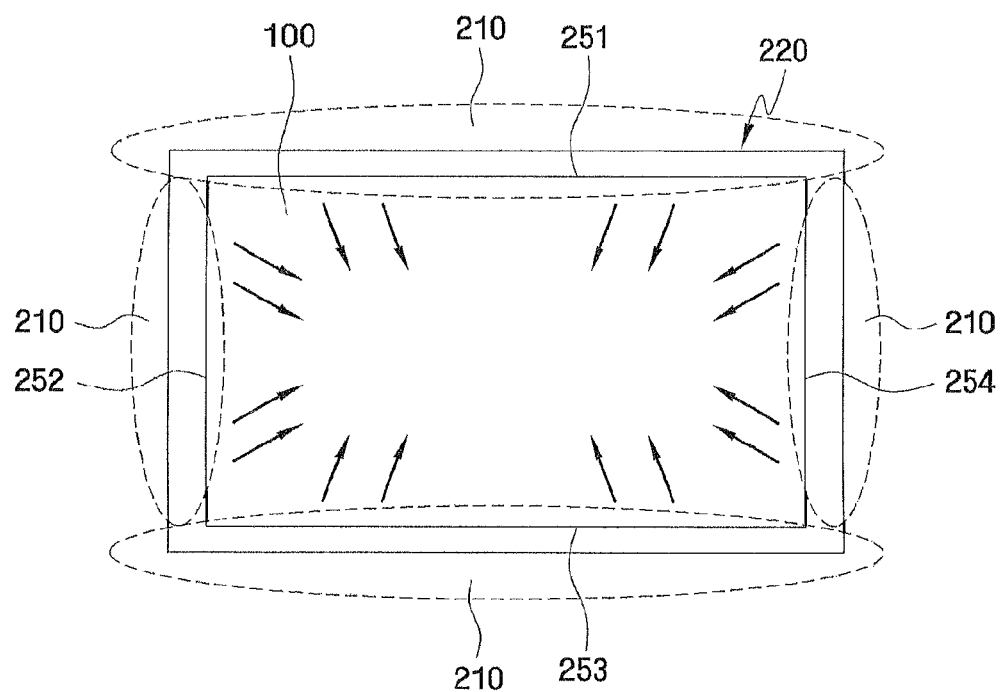
FIG. 3B is a front view of the LCD of FIG. 3A, illustrating the arrangement of a display panel and light sources.

FIG. 3A is a front view of an LCD 10 according to an exemplary embodiment of the present invention. FIG. 3B is a front view of the LCD 10 of FIG. 3A, illustrating the arrangement of a display panel 100 and light sources 210.

Referring to FIG. 3A, the LCD 10 includes a display panel 100. The display panel 100 may be a transmissive LCD panel, a semi-transmissive LCD panel, or a reflective LCD panel.

The display panel 100 may include two or more unit display panels. For example, if the display panel 100 is a laminated structure of two unit display panels, a first unit display panel may display an image on a front surface thereof, and a second unit display panel may display an image on a rear surface thereof. Images displayed on the first and second unit display panels may be identical or different.

According to an embodiment, the display panel 100 may include one unit display panel. According to an embodiment, the unit display panel may display images on both surfaces thereof, for example, front and back surfaces, so that the LCD 10 can be utilized as a dual LCD. According to an embodiment, images displayed on both surfaces of the display panel 100 may be identical or different.

The LCD 10 may further include a structure, such as the chassis 220, formed in a region around the display panel 100. The light sources 210 may be installed in the region where the chassis 220 is formed. If the light sources 210 are installed in the region around the display panel 100, for example, within the chassis 220, light emitted from the light sources 210 may be invisible to the naked eye.

The arrangement of the display panel 100 and the light sources 210 will now be described in more detail with reference to FIG. 3B. Referring to FIG. 3B, the light sources 210 may respectively be formed along four sides 251, 252, 253, and 254 of the display panel 100. The light sources 210 may be formed at some or all of the four sides 251, 252, 253, and 254. According to an exemplary embodiment, the light sources 210 may be formed at only one of the four sides 251, 252, 253, and 254 or at two or more of the four sides 251, 252, 253, and 254. If a region around the four sides 251, 252, 253, and 254 of the display panel 100 is covered by the chassis 220, the light sources 210 are located within the chassis 220 regardless of along which of the four sides 251, 252, 253, and 254 the light sources 210 are formed. Accordingly, light emitted from the light sources 210 can be prevented from being seen with the naked eye.

Figure 4A:
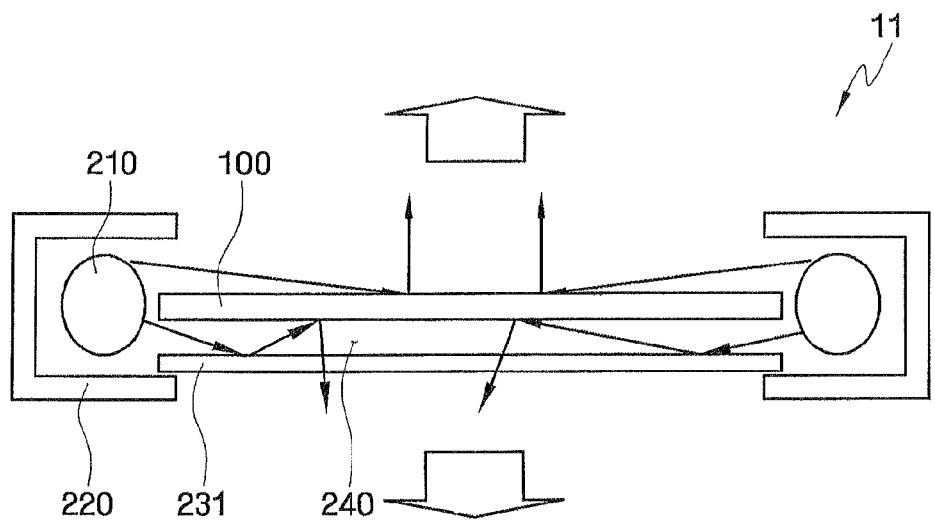
FIGS. 4A and 4B are side views of LCDs according to some exemplary embodiment of the present invention.
Figure 4B:
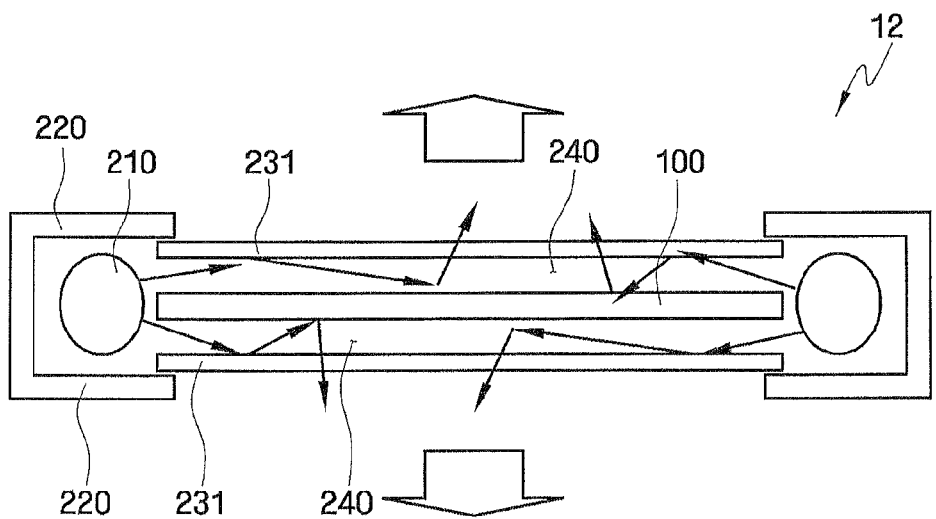

FIGS. 4A and 4B are side views of LCDs 11 and 12 according to some exemplary embodiments of the present invention. Referring to FIGS. 4A and 4B, each of the LCDs 11 and 12 includes at least one light source 210 which provides light, a display panel 100 which includes pixels reflecting light emitted from the light source 210, and at least one LGP 231 which is separated from the display panel 100 and is substantially parallel to a surface of the display panel 100.

The light source 210 provides light to the display panel 100. The light source 210 may be a cold cathode fluorescent lamp (CCFL), a light-emitting diode (LED), or any other optical element that emits light.

The display panel 100 may be a dual LCD panel which receives light from the light source 210 and reflects light off both surfaces thereof. Since the display panel 100 has been described above with reference to FIG. 3A, a detailed description thereof will be omitted.

The LGP 231 reflects light emitted from the light source 210 towards the pixels of the display panel 100. Then, the LGP 231 allows the light reflected by the pixels to pass through the LGP 231, thereby enabling each of the LCDs 11 and 12 to display an image.

The LGP 231 and the display panel 100 are separated from each other, leaving a space 240 between the LGP 231 and the display panel 100. The space 240 may be, e.g., an air gap containing air. The space 240 may further contain other materials in addition to air. Due to the characteristics of the air and materials introduced into the space 240, heat released from the display panel 100 can be effectively delivered out of each of the LCDs 11 and 12. Furthermore, as the air and the materials introduced into the spaces 240 circulate, heat released from the display panel 100 can be more effectively dissipated out of each of the LCDs 11 and 12. Therefore, the deformation or malfunction of the display panel 100 resulting from heat accumulated in the display panel 100 can be reduced.

The LGP 231 and the space 240 may be formed on only one surface of the display panel 100 as shown in FIG. 4A or may be formed on both surfaces of the display panel 100 as shown in FIG. 4B.

The LGP 231 may be made of transparent plastic or glass. For example, the LGP 231 made of glass can function as a protective glass plate of the display panel 100. Accordingly, a protective glass plate to protect the display panel 100 can be omitted from the LCDs 11 and 12.

Figure 5:
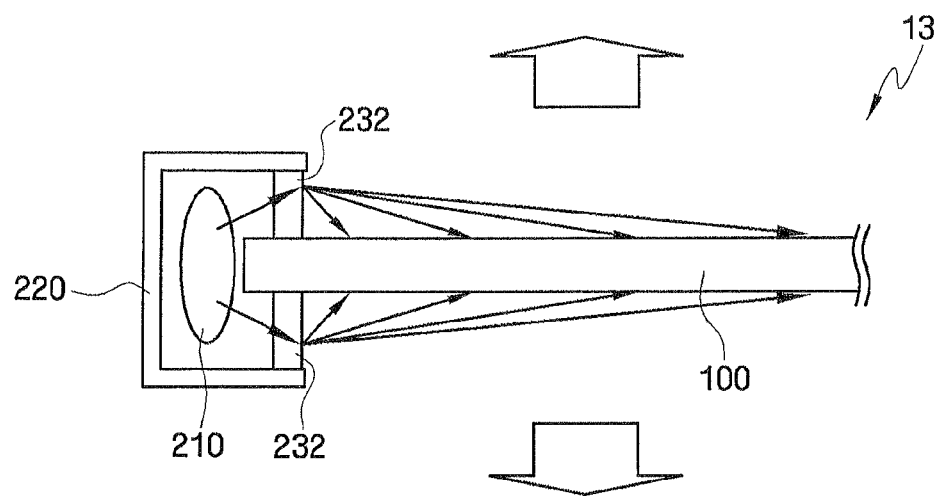
FIG. 5 is a side view of an LCD according to an exemplary embodiment of the present invention.
Figure 6A:
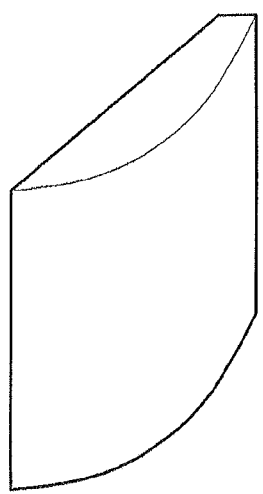
FIGS. 6A through 6I are views showing the shape of an optical path controller according to various exemplary embodiments of the present invention.
Figure 6B:
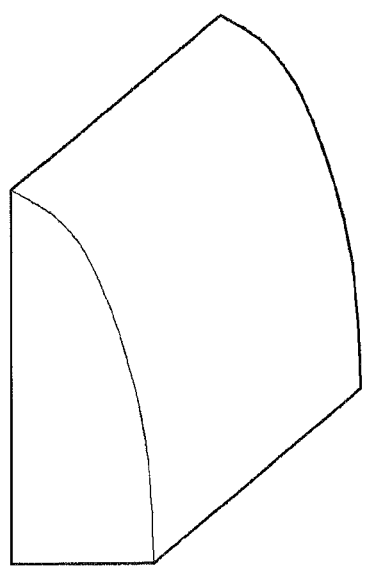
Figure 6C:
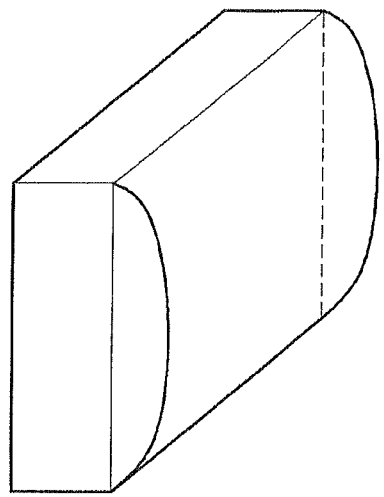
Figure 6D:
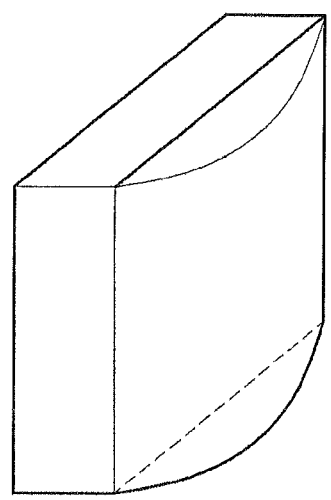
Figure 6E:
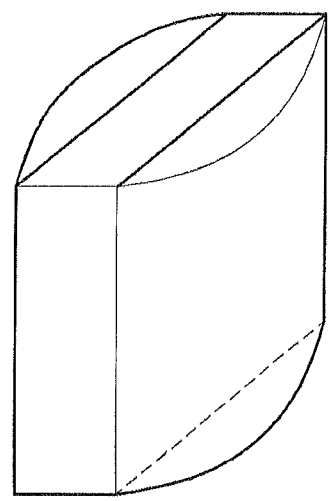
Figure 6F:
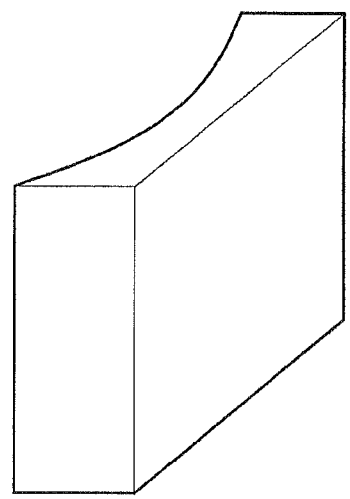
Figure 6G:
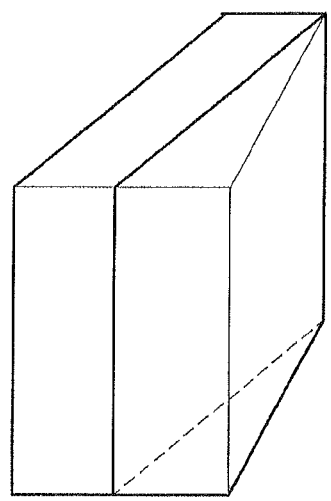
Figure 6H:
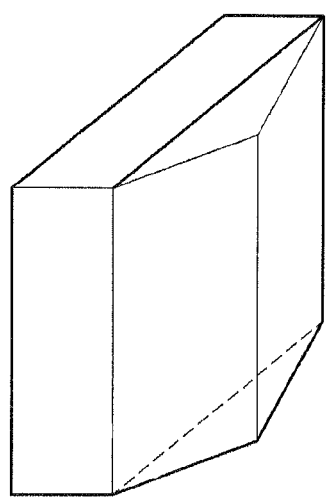
Figure 6I:
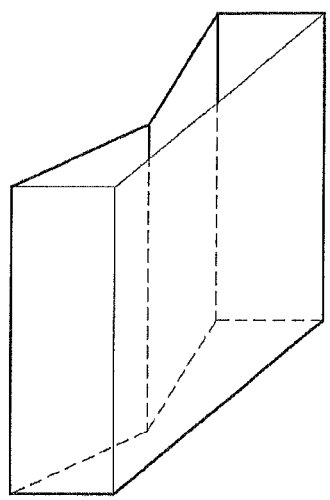

FIG. 5 is a side view of an LCD 13 according to an exemplary embodiment of the present invention. Referring to FIG. 5, the LCD 13 includes at least one light source 210 which provides light, a display panel 100 which includes pixels reflecting light emitted from the light source 210, and an optical path controller 232.

The light source 210 and the display panel 100 are substantially identical to those according to the previous embodiments and thus their descriptions will not be repeated.

The optical path controller 232 is disposed in an optical path between the light source 210 and the pixels of the display panel 100. Accordingly, the optical path controller 232 controls the path of light emitted from the light source 210 such that light can be delivered to the pixels of the display panel 100. For example, according to an embodiment, the optical path controller 232 may change the path of light received from the light source 210 by refracting light. However, the present invention is not limited thereto. According to an exemplary embodiment, the optical path controller 232 may refract incident light to the pixels of the display panel 100. If the angle of refraction is controlled by finely adjusting the material and shape of the optical path controller 232, incident light can be uniformly delivered to the entire surface of the display panel 100. That is, the optical path controller 232 can substantially function as a light guide.

FIGS. 6A through 6I are views illustrating the shape of an optical path controller according to various exemplary embodiments of the present invention. Referring to FIGS. 6A through 6I, the optical path controller can have a varied number of sides, various surface forms (a flat surface or a curved surface), and various sizes. The optical path controller may also be horizontally symmetrical. The optical path controller is not limited to the shape shown in FIGS. 6A through 6I and may have other shapes.

Figure 7:
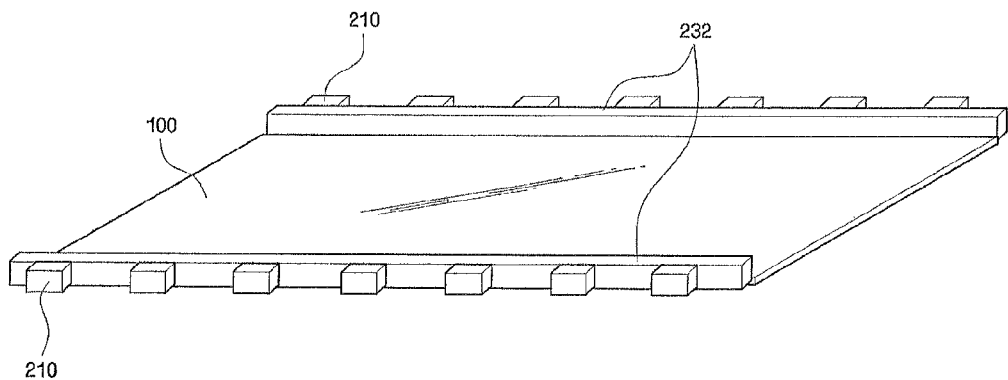
FIG. 7 is a view showing optical path controllers and a display panel according to an exemplary embodiment of the present invention.

FIG. 7 is a view illustrating optical path controllers 232 and a display panel 100 according to an exemplary embodiment of the present invention. Referring to FIG. 7, the optical path controllers 232 may respectively be formed on two sides of the display panel 100. Further, the optical path controllers 232 may be formed adjacent to light sources 210. As shown in FIG. 7, each of the optical path controllers 232 is formed as a single body along a side of the display panel 100. However, the embodiments of the present invention are not limited thereto. Each of the optical path controllers 232 may also be divided into one or more block regions corresponding respectively to one or more regions of the light sources 210.

Figure 8:
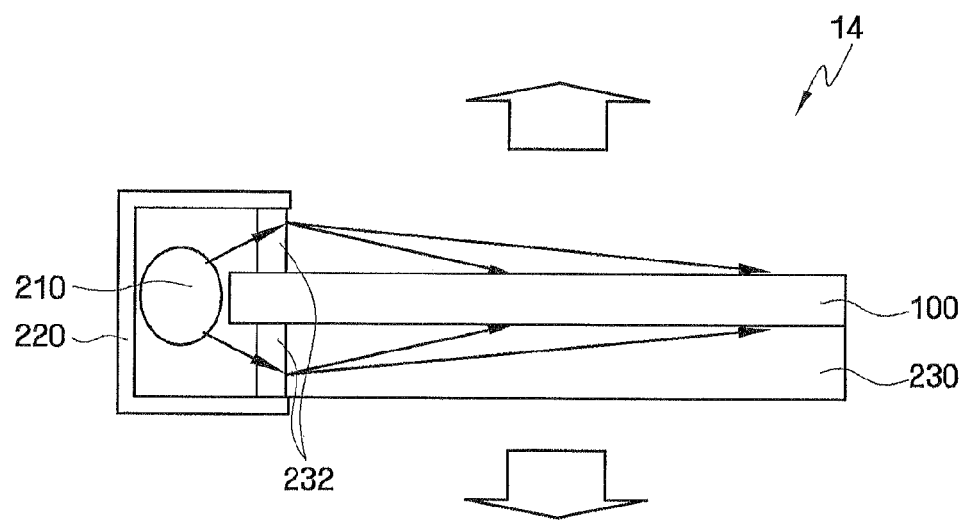
FIG. 8 is a side view of an LCD according to an exemplary embodiment of the present invention.

FIG. 8 is a side view of an LCD 14 according to an exemplary embodiment of the present invention. Referring to FIG. 8, the current embodiment is different from the embodiment described in connection with FIG. 7 in that the LCD 14 further includes an LGP 230 formed substantially parallel to a surface of a display panel 100. As shown in FIG. 8, the LGP 230 is formed on only one surface of the display panel 100. However, the LGP 230 may also be formed on two surfaces of the display panel 100. If both the optical path controller 232 and the LGP 230 are provided as in the current exemplary embodiment, light can be efficiently and uniformly diffused over the entire surface of the display panel 100.

Figure 9:
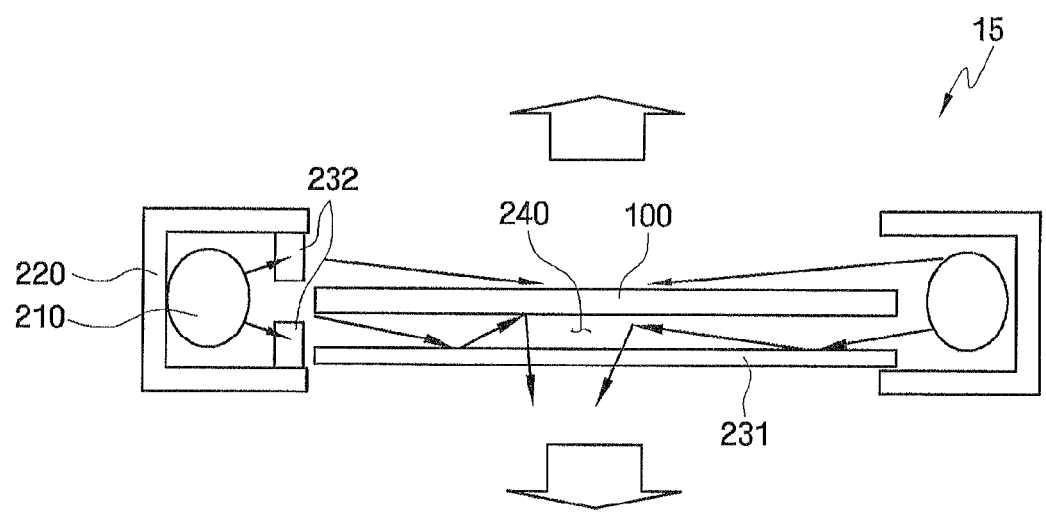
FIG. 9 is a side view of an LCD according to an exemplary embodiment of the present invention.

FIG. 9 is a side view of an LCD 15 according to an exemplary embodiment of the present invention. Referring to FIG. 9, the current embodiment and the embodiment described in connection with FIG. 8 are the same in that the LCD 15 further includes an LGP 231 formed substantially parallel to a surface of the display panel 100 but are different in that the LGP 231 is separated from the display panel 100 to define a space 240. In FIG. 9, the LGP 231 is formed on only one surface of the display panel 100. However, the LGP 231 may also be formed on two surfaces of the display panel 100. If both the optical path controller 232 and the LGP 230 are provided as in the current exemplary embodiment, light can be efficiently and uniformly diffused over the entire surface of the display panel 100. In addition, the space 240 between the display panel 100 and the LGP 231 can facilitate the dissipation of heat from the display panel 100.

According to exemplary embodiments of the present invention, an LGP is formed on one side of a display panel to be separated from the display panel by a predetermined gap and to be parallel to the display panel. The LGP can deliver incident light to the entire region of the display panel and protect the display panel against internal and external physical forces. In addition, a cooling air circulation passage formed between the LGP and the display panel can contribute to the dissipation of heat from an LCD. Furthermore, an optical path controller is formed in an optical path between a light source and the display panel to be perpendicular to a surface of the display panel. The optical path controller controls light emitted from the light source to be delivered more uniformly to the entire region of the display panel.

However, the embodiments of the present invention are not restricted to those set forth herein. The above and other embodiments of the present invention will become more apparent to one of ordinary skill in the art to which the present invention pertains by referencing the detailed description of the invention.

While the present invention has been particularly shown and described with reference to exemplary embodiments thereof, it will be understood by those of ordinary skill in the art that various changes in form and detail may be made therein without departing from the spirit and scope of the present invention as defined by the following claims. The exemplary embodiments should be considered in a descriptive sense only and not for purposes of limitation.

What is claimed is:

1. A liquid crystal display (LCD) comprising:
at least one light source which provides light;
a display panel which comprises pixels reflecting the light from the light source; and
at least one light guide plate (LGP) formed substantially parallel to a top or bottom surfaces of the display panel and separated from the display panel,
wherein a predetermined space is defined between the LGP and the display panel, and the LGP guides the light emitted from the light source to the pixels and allows the light reflected by the pixels to pass through the LGP, and wherein the light source is located on at least one of sides of the display panel, wherein the sides of the display panel are substantially perpendicular to the top or bottom surfaces of the display panel, wherein the space contains air.

2. The LCD of claim 1, wherein the display panel receives the light from the light source and reflects the light off two surfaces thereof.

3. The LCD of claim 2, wherein the LGP and another LGP are respectively formed both in front of and behind the display panel.

4. The LCD of claim 1, wherein the LGP is formed of glass.

5. The LCD of claim 1, wherein the light source is a light-emitting diode.

6. A liquid crystal display (LCD) comprising:
at least one light source which provides light;
a display panel which comprises pixels reflecting the light from the light source;
at least one light guide plate (LGP) formed substantially parallel to a top or bottom surface of the display panel and separated from the display panel; and
an optical path controller disposed in an optical path between the light source and the LGP,
wherein a predetermined space is defined between the LGP and the display panel, and the LGP guides the light emitted from the light source to the pixels and allows the light reflected by the pixels to pass through the LGP, and wherein the light source is located on at least one of sides of the display panel, wherein the sides of the display panel are substantially perpendicular to the top or bottom surface of the display panel, and wherein the optical path controller controls a path of the light, which is emitted from the light source and is not heading for the LGP, to proceed to the LGP by refracting the light.

7. The LCD of claim 6, wherein the optical path controller is formed in a region around the display panel.

8. The LCD of claim 7, wherein the optical path controller is formed along a side of the display panel.

9. A liquid crystal display (LCD) comprising:
at least one light source which provides light;

a display panel which comprises pixels reflecting the light from the light source;

at least one light guide plate (LGP) formed substantially parallel to a top or bottom surface of the display panel and separated from the display panel; and an optical path controller disposed in an optical path between the light source and the LGP, wherein a predetermined space is defined between the LGP and the display panel, and the LGP guides the light emitted from the light source to the pixels and allows the light reflected by the pixels to pass through the LGP, and wherein the light source is located on at least one of sides of the display panel, wherein the sides of the display panel are substantially perpendicular to the top or bottom surface of the display panel, and wherein the LGP and the optical path controller are formed as a single body.

10. An LCD comprising:

at least one light source which provides light;

a display panel which comprises pixels reflecting light from the light source;

optical path controllers respectively disposed directly above and directly under the display panel; and at least one light guide plate (LGP) formed substantially parallel to a surface of the display panel and disposed in an optical path between the optical path controllers and the pixels of the display panel, wherein the LGP controls a path of the light output from the optical path controllers to proceed to the pixels of the display panel, and wherein the optical path controllers refract the light emitted from the light source to the pixels of the display panel.

11. The LCD of claim 10, wherein the optical path controllers control the path of the light, which is emitted from the light source and is not heading for the pixels, to proceed to the pixels by refracting the light.

12. The LCD of claim 10, wherein the display panel receives the light from the light source and reflects the light off both surfaces thereof.

13. The LCD of claim 10, wherein the light source is a light-emitting diode.

14. The LCD of claim 10, wherein the optical path controllers are formed in a region around the display panel.

15. The LCD of claim 14, wherein the optical path controllers are formed along a side of the display panel.

16. The LCD of claim 10, wherein the LGP is formed of glass.

17. The LCD of claim 10, wherein the LGP and the optical path controllers are formed as a single body.

18. An LCD comprising:

at least one light source which provides light;

a display panel which comprises pixels reflecting light from the light source; and optical path controllers respectively disposed directly above and directly under the display panel, wherein the optical path controllers refract the light emitted from the light source to the pixels of the display panel, wherein at least a portion of the light refracted by the optical path controller is immediately incident on the display panel.

* * * * *